United States Patent
Regan

[11] Patent Number: 5,882,550
[45] Date of Patent: Mar. 16, 1999

[54] FIRE RETARDANT AGENTS SUITABLE FOR PLASTICS

[75] Inventor: Christopher John Regan, Castle Hill, Australia

[73] Assignee: Bains Harding Limited, Osborne Park, Australia

[21] Appl. No.: 615,229

[22] PCT Filed: Sep. 14, 1994

[86] PCT No.: PCT/AU94/00545

§ 371 Date: Oct. 1, 1996

§ 102(e) Date: Oct. 1, 1996

[87] PCT Pub. No.: WO95/07947

PCT Pub. Date: Mar. 23, 1995

[30] Foreign Application Priority Data

| Sep. 14, 1993 | [AU] | Australia | PM1221 |
| Apr. 29, 1994 | [AU] | Australia | PM5382 |
| May 4, 1994 | [AU] | Australia | PM5442 |

[51] Int. Cl.[6] ............... C09K 21/00; C08K 5/15
[52] U.S. Cl. .................. 252/609; 524/107
[58] Field of Search ............... 252/609; 524/107

[56] References Cited

U.S. PATENT DOCUMENTS

| 4,246,146 | 1/1981 | Wood et al. | 524/14 |
| 4,254,177 | 3/1981 | Fulmer | 428/256 |
| 4,349,494 | 9/1982 | Fulmer | 264/45.3 |
| 4,680,324 | 7/1987 | Malwitz | 524/88 |
| 4,816,186 | 3/1989 | Acitelli | 252/610 |
| 4,871,477 | 10/1989 | Dimanshteyn | 252/609 |
| 5,268,393 | 12/1993 | Blount | 521/85 |
| 5,344,855 | 9/1994 | Narita et al. | 523/179 |

*Primary Examiner*—C. H. Kelly
*Attorney, Agent, or Firm*—Synnestvedt & Lechner

[57] ABSTRACT

A fire retardant agent to be incorporated in a plastic, especially polyurethane foam which functions as a foaming agent and comprises a mixture of soluble ammonium salts selected from the group consisting of ammonium monophosphate, ammonium diphosphate and an ammonium halide; and urea. Processes and apparatus for the production of a polyurethane foam are also described.

22 Claims, 1 Drawing Sheet

FIRE RETARDANT AGENTS SUITABLE FOR PLASTICS

FIELD OF THE INVENTION

This invention relates to fire retardant agents which, when added to a material during its manufacture, provide a fire resistant or fire retardant characteristic to that material. Of special interest from the point of view of the invention are polymers, especially polyurethanes.

BACKGROUND OF THE INVENTION

It is well known to use certain chemicals and mixtures of chemicals as fire retardants for materials such as fabrics, rigid and flexible plastics foamed and non-foamed, timber, particle board and the like. The kinds of fire retardant agents employed vary with the material of interest and thus fire retardant agents considered suitable for application to one type of material may be completely unsuitable for another.

In the polyurethane industry, inorganic fire retardants which are soluble in nature are generally disregarded because they will leach from the polyurethane foam with deleterious results. For example, it is known from the literature the difficulties encountered with the soluble nature of ammonium monophosphate.

U.S. Pat. No. 3,423,343 assigned to Monsanto Company also discloses the above problem with ammonium monophosphate and ammonium orthophosphates in general and discusses the additional problem encountered with loss of physical properties such as compressive strength and closed cell content.

The above patent proposes the use of phosphorus and nitrogen compounds in the form of substantially water insoluble ammonium polyphosphates, having P—O—P type linkages and the general formula:

where n is an integer having an average value greater than 10 and m/n is between about 0.7 and about 1.1 and the maximum value of m is equal to n+2.

Now, this compound sold under the trade name PHOSCHEK 30 by Monsanto Company is certainly less soluble than ammonium monophosphate or ammonium diphosphate and is described by Lewin, Atlas & Pearce, Vol 1, "Polyurethane Structure and Flame Resistance" to have flame spread of 36% after 7 days immersion in water, as opposed to 33% before immersion. However, Miles, C. E and Lyons, J. W report in "Properties of Rigid Urethane Foams Containing Fire Retardants based on Phosphorus", Journal of Cellular Plastics, p 539, December 1967 that polyurethane rigid foams containing this ammonium polyphosphate require a chlorofluorinated compound (CFC) blowing agent, trichlorofluoromethane in manufacture, and demonstrated an average weight loss of 10.0% upon ignition.

Leaving aside the issue of the use of a CFC blowing agent, in itself undesirable, for the present further disadvantage may occur in that the decomposition temperature is such that a reduced amount of char is formed. This results in either a reduced fire protection or the increased expense of using more material to achieve adequate protection.

Thus, present development in the art favours the use of organic fire retardants for use in polyurethane applications.

For example, U.S. Pat. No. 4,623,672, assigned to Bayer AG, discloses flame retardant isocyanate addition products made by reacting an isocyanate with a compound selected from the group consisting of 1-phosphonoethane-2-carboxylic acid-tri-$C_1$-$C_4$-alkyl esters, 1-phosphonopropane-2-carboxylic acid-tri-$C_1$-$C_4$-alkyl esters and mixtures thereof. Blowing agents may include CFC agents, the examples particularly specify the use of trichlorofluoromethane, and foams prepared in accordance with this patent are ignitable.

Australian Patent No. 591089 assigned to Ciba-Geigy Limited employs as fire retardant a salt formed by reaction between dimethyl methyl phosphonate, monomethyl methyl phosphonate and a compound of the general formula (I):

in which X is O,S or NH, $R^1$ is H, alkyl with 1 to 4 carbon atoms, alkenyl of up to 4 carbon atoms, CN, $CONH_2$ or $NH_2$, $R^2$ is H, alkyl with 1 to 4 carbon atoms or alkenyl of up to 4 carbon atoms or $R^1$ and $R^2$ together with the nitrogen atom to which they are attached form a heterocyclic ring of up to 6 carbon atoms which may optionally contain another heteroatom and R is H, an alkyl group with 1 to 8 carbon atoms, an aryl group with 6 to 10 carbon atoms, a cycloalkyl group with 5 to 12 carbon atoms or a heterocyclic group with up to 9 ring carbon atoms or a heterocyclic group with up to 9 ring carbon atoms, or, together with $R^1$ forms an alkylene chain of 3 to 10 carbon atoms, or R is a group $NHR^3$ wherein $R^3$ is H, alkyl with 1 to 4 carbon atoms, alkenyl of up to 4 carbon atoms, CN, $CONH_2$ or $NH_2$ or together with $R^1$ forms an alkylene chain of 2 or 3 carbon atoms, or R is a group

where $R^1$, $R^2$ and X are as defined above and $R^4$ is a direct bond or an alkylene group having up to 8 carbon atoms or is an arylene group having 6 to 10 carbon atoms.

These flame retardants are of low volatility and allow the formation of polyol formulations which are stable on storage. Again CFC blowing agents, namely dichlorodifluoromethane or trichlorofluoromethane, are noted as being especially desirable and trichlorofluoromethane is exemplified. Tests conducted according to German Standard DIN 4102 B2 reported a burn time of 9 to 15 seconds with one of the examples burning with maximum flame height 13 cm but no burn time being recorded. In all cases, loss on ignition or oxygen index is greater than 23.5% by weight.

U.S. Pat. No. 4,895,878 assigned to Recticel discloses the use of a fire retardant comprising at least one of the components: (1) linear urea-formol oligomer mixture having the general formula $NH_2$—CO—NH—[$CH_2$—NH—CO—$NH]_n$—$CH_2$—NH—CO—$NH_2$ wherein n is from 0 to 50: (2) urea in powdered form of which the particles are at least partially recovered by a less soluble film, being sulphur or a resin; (3) dicyandiamide having the general formula:

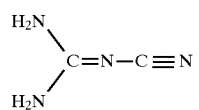

A secondary fire retardant, for example, tris-(2-chloroethyl)-phosphate may also be included in the formulation together with a mixture of trichlorofluoromethane and methylene chloride as the blowing agent, so again the use of a CFC blowing agent is proposed.

Foams prepared in accordance with U.S. Pat. No. 4,895,878 burn with loss on ignition of 23 to 34% by weight and when exposed to a blowtorch test with an oxygen rich flame with length 15 cm at 1100° C. applied perpendicular on a 3 cm large test steel plate during 30 seconds at a distance of 3 cm (between the output of the blowtorch and the test steel) burn, at best, within 10 seconds.

The burning behaviour of polyurethane foams prepared in the accordance with the above may be satisfactory for some applications but there is a need to produce polyurethane foams with greater fire resistance, especially flexible foams which have generally lower fire retardance than rigid foams.

Further, the prior art suggests that CFC blowing agents are still very much a feature of the polyurethane manufacturing industry. However, this situation cannot continue. As a result of an International Agreement, the use of CFC agents must be phased out by the year 1997 due to the atmospheric damage apparently caused by such agents. This clearly poses a serious technical problem for the polyurethane industry since blowing agents are presently perceived as essential to the formation of commercial foams. Blowing agents are introduced to polyurethanes and other polymers during manufacture to cause gas evolution which allows the production of the cellular structure in foams commonly encountered in packaging, furniture and building products as well as other applications.

Two types of foam are employed—these being the flexible type and the rigid type. Both types of foam have a cellular structure and are made from the same basic ingredients. These ingredients are bought as a "system" from large chemical companies and are tailored to achieve individual specifications suitable for various applications. Accordingly, and as the described prior art illustrates, technical pressures exist on chemical companies to produce foams with the required properties.

It is the general object of the present invention to provide a fire retardant agent for plastic foams that is substantially free of the above described limitations.

It is a first specific object of the present invention to provide a fire retardant agent that has substantially reduced ignitability from prior art fire retardant agents as described above.

It is a second specific object of the present invention to provide a fire retardant agent, that through its nature, allows the use of CFC blowing agents to be avoided.

It is a third specific object of the present invention to provide a fire retardant agent, formulated from compounds which are of economically sustainable cost.

It is a fourth specific object of the present invention to provide a process for the manufacture of a plastic, especially polyurethane, foam which allows the attainment of good physical properties such as compressive strength and good fire retardance.

SUMMARY OF THE INVENTION

With the above objects in view, the present invention provides, in a first aspect, a fire retardant agent to be incorporated in a plastic foam which functions as a blowing agent and comprises a mixture of soluble ammonium salts selected from the group consisting of ammonium monophosphate, ammonium diphosphate and an ammonium halide; and urea.

The plastic foam may be a polyurethane foam but this is not essential to the invention. The fire retardant agent may equally be applied in the case of other plastic foams subject to the above described fire retardant components being compatible with the plastic foam under consideration.

Conveniently, the agent is added to a polymerisation reaction mixture, for example a polyol component or isocyanate component in the case of the production of a polyurethane foam; in an amount preferably corresponding to between 40 and 60%, more preferably 50 to 53%, of the total weight of the polymerisation reaction mixture. This range is not intended to be limiting and the proportion of the agent added may vary with the desired degree of fire retardance. By interaction with other constituents of the polymerisation reaction mixture, the agent advantageously produces the necessary gas for foam expansion without the requirement for CFC blowing agents.

A suitable agent may be produced by mixing 50 to 60, more preferably 52 to 58, percent by weight of the agent ammonium halide; 5 to 15, more preferably 8 to 11, percent by weight of the agent ammonium monophosphate; 5 to 15, more preferably 8 to 11, percent by weight of the agent ammonium diphosphate; and 20 to 30, more preferably 24 to 28, percent by weight of the agent urea. Preferably, the ammonium halide selected is ammonium bromide.

In a second aspect, the present invention provides a process of polyurethane foam manufacture comprising the admixture of the above described fire retardant agent with an isocyanate and a polyol. Preferably, the agent is mixed with the isocyanate first.

In a specific embodiment, the process comprises the steps of:

(a) mixing an isocyanate with a fire retardant agent comprising a mixture of soluble ammonium salts selected from the group consisting of ammonium monophosphate, ammonium diphosphate and an ammonium halide; and urea;

(b) feeding the mixture from step (a) to a mixer, to which is introduced the polyol and a solvent; and mixing these components together; and (c) adding at least one polymerisation catalyst and optionally water and conducting the polymerisation reaction.

The polymerisation reaction is desirably conducted in a mixer stirred with a high speed impeller. High speed intensive mixing is aimed at maintaining the above described components in suspension throughout the duration of the polymerisation reaction. It is to be understood that failure to maintain the components in suspension may lead to failure to attain a uniform homogeneous polyurethane foam.

In a third aspect, the present invention provides an apparatus for producing a polyurethane foam in accordance with the process of the second aspect of the present invention. The apparatus comprises a holding vessel to hold an isocyanate component comprising isocyanate and fire retardant agent components; first means for mixing the combination of isocyanate and fire retardant agent; first introduction means for bringing a polyol component comprising a polyol and a solvent into contact with the isocyanate and fire retardant agent; second means for mixing the isocyanate component agent with the polyol component; second introduction means for introducing a polymerisation catalyst component and, optionally, water to the mixture of the isocyanate component and the polyol component; and a high speed mixing means for further mixing of the isocyanate component with the polyol component in the presence of the polymerisation catalyst component and enabling homogeneous polymerisation thereof.

The holding vessel is desirably provided with an atmosphere of inert gas, for example nitrogen or argon.

The apparatus may be provided with recycle means to allow return of the isocyanate and fire retardant agent to the first mixing means until the consistency of the product isocyanate component is such as to enable satisfactory contacting with the polyol component.

In a fourth aspect, the present invention provides a formulation for manufacture of a polyurethane foam comprising an isocyanate; a polyol; a catalyst system and a fire retardant agent comprising a mixture of soluble ammonium salts selected from the group consisting of ammonium monophosphate, ammonium diphosphate and an ammonium halide; and urea, each component being brought into contact in a sequence to enable production of a polyurethane foam. Preferably, the ammonium halide is ammonium bromide.

Further aspects of the invention include the polyurethane foams including the above fire retardant agent; foams manufactured in the above described process and apparatus. Polyurethane foams produced from the above described formulation and articles, for example panels and other items for use in the building or furniture industry, also form part of the invention.

The polyurethane foams prepared in accordance with the above described process and containing the above described fire retardant agent are found to have greatly reduced tendency to ignite. Solubility of the ammonium salts, without wishing to be bound by any theory, is apparently reduced by admixture with urea. The fire retardant compounds are commodity chemicals, readily sourced at reasonable cost from chemical manufacturers. Therefore, a product polyurethane foam may be rendered fire retardant and resistant to ignition by use of a fire retardant agent sourced and produced at an economically sustainable cost. Indeed, the compounds used in the fire retardant agent generally cost less than the base materials required to form the polyurethane foam, namely polyols and isocyanates.

DETAILED DESCRIPTION OF THE INVENTION

Figure 1:
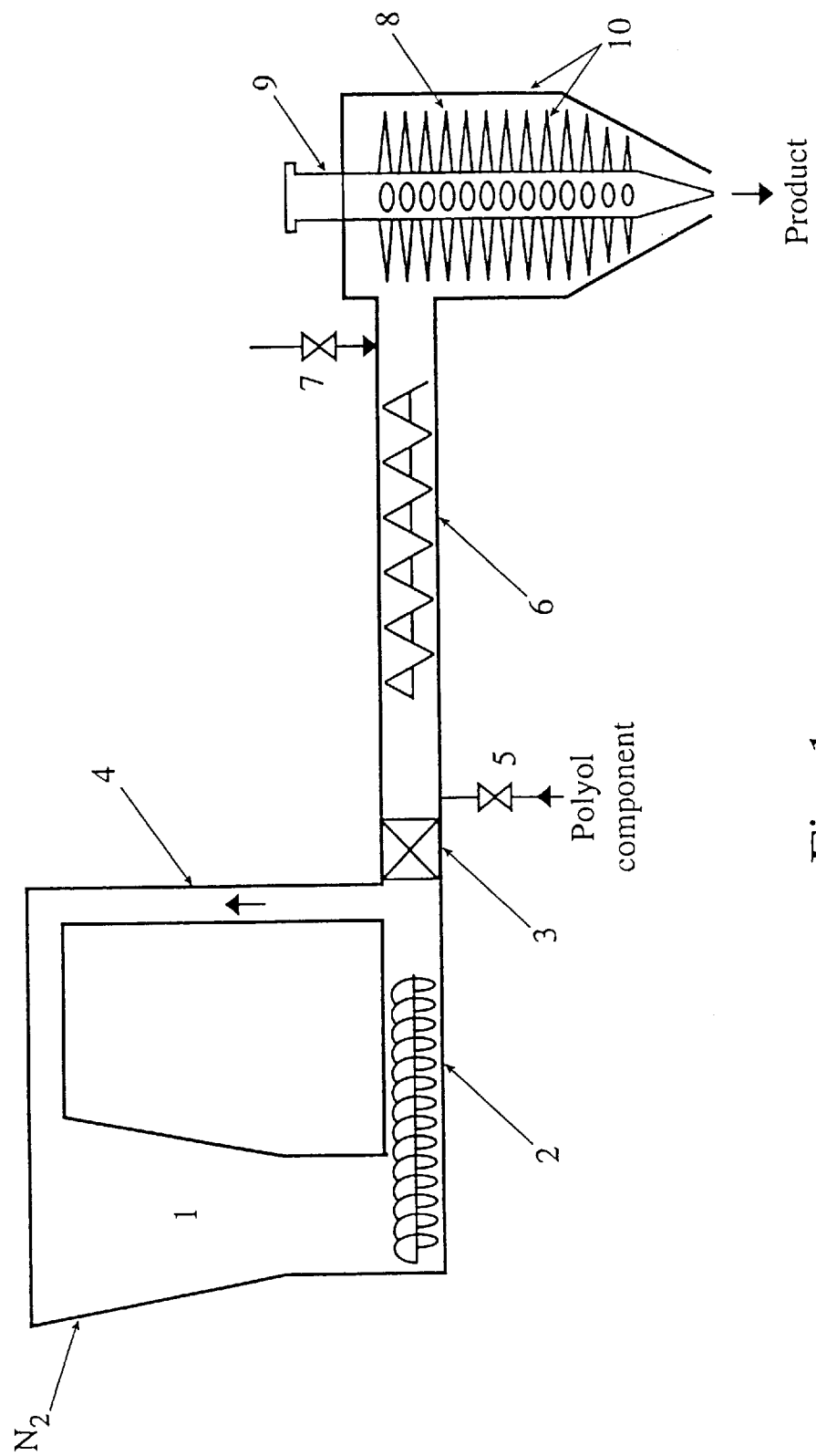

The invention will be more clearly understood from the following description and reference to the appended examples and drawing in which:

FIG. 1 is a schematic of the apparatus used in accordance with the invention for the manufacture of a rigid polyurethane foam.

The general reaction scheme for the formation of rigid polyurethane foams is generally understood by those skilled in the art of foam manufacture and proceeds from the reaction of isocyanates and diisocyanates with other difunctional groups such as polyols and polyesters, possibly in admixture.

Indicative of diisocyanates that can be used are liquids such as methyl diisocyanate, diphenyl methane diisocyanate, toluene diisocyanate, methylene diphenyl diisocyanate, polymeric methylene diphenyl diisocyanate, isophorone diisocyanate, hexamethylene diisocyanate, hydrogenated methylene diphenyl diisocyanate or any polyisocyanate containing two or more reactive isocyanate groups. Especially preferred in the case of the present invention is an isocyanate formulation containing 40–50 wt % diphenylmethane diisocyanate (MDI, CAS 26447-40-5) containing methylene bisphenyl isocyanate in admixture with 50–60 wt % polymethylene polyphenyl isocyanate (CAS 9016-87-9) sourced under the trade name APTANE B900 from Aptane.

As suitable polyols may be mentioned, for example, those listed in Australian Patent No. 591089 assigned to Ciba-Geigy Limited being a polyfunctional organic compound containing a plurality of hydroxyl groups. Such include, for rigid foam applications, glycerol, sucrose, sorbitol, trimethyl propanol, pentaerythritol, triethanolamine, or an amine such as ethylene diamine, polyaromatic amine, or an aromatic Mannich base with propylene oxide and/or ethylene oxide. Any of these polyols may be employed as a rigid base polyol and, particularly preferred in the case of the present invention is a proprietary polyol formulation comprising propoxylated glycerine (CAS 25791-96-2) and propoxylated sucrose (CAS 9049-71-2) sourced under the trade name Voranol 360A from Dow Chemical Corporation. Desirably, only one such rigid base polyol is selected for use in the mixture. Admixture of two or more rigid base polyols may provide a foam with less desirable properties.

Nonetheless, a further compound reactive with the selected isocyanate may be added to the polyol component. This compound may, for example, be a polyester. As mentioned in U.S. Pat. No. 4,623,672 assigned to Bayer AG, the polyester may contain from 2 to 4 hydroxyl groups, suitable polyesters including reaction products of polyols, especially dihydric and trihydric alcohols for example as described above, with preferably divalent carboxylic acids. Suitable carboxylic acids include succinic acid, adipic acid, suberic acid, azelaic acid, sebacic acid, phthalic acid, isophthalic acid, trimellitic acid, maleic acid, fumaric acid, dimerised and trimerised unsaturated fatty acids (optionally mixed with monomeric unsaturated fatty acids such as oleic acid). Derivatives of these compounds may also be employed. Especially preferred in the case of the present invention is a proprietary polyol formulation sourced under the trade name Stepanpol PS3152 from Stepan Company, Illinois, USA.

The ammonium salts for use in the fire retardant agent of the present invention are food grade ammonium mono phosphate and ammonium diphosphate and an ammonium halide. Especially preferred as the ammonium halide is photographic grade 99.5% ammonium bromide, though ammonium chloride could also be used. Each of these compounds, with the exception of ammonium halide, is a bulk commodity chemical and readily obtainable. In the examples to be described, ammonium bromide was sourced from Consolidated Chemicals, Sydney. The ammonium phosphates were sourced from Albright & Wilson, Sydney. The ammonium bromide may require to be specially ordered in commercial quantities from a chemical manufacturer.

The remaining component of the fire retardant agent, namely industrial grade urea, was sourced from Incitec, Sydney.

Remaining components of the formulation include a suitable surfactant, catalyst and solvent. The surfactant is required to ensure that mixing of the various components is facilitated and the resulting mixture is homogeneous in physical properties and composition. Desired bubble and cell formation and a uniform distribution thereof throughout the product foam depend upon the use of a surfactant.

As a small amount of water may be introduced to the polymerisation reaction mixture to assist with foam expansion, the surfactant is desirably non-hydrolysable and, as preferred examples, may be mentioned polydimethylsiloxane and polydimethyl siloxane polyalkylene copolymers. Especially preferred in the present instance is the surfactant L5420 which is a proprietary polyalkyleneoxidemethylsiloxane copolymer sourced from OSI Specialities Inc. Alternatively may be used a non-hydrolysable polysiloxanepolyether copolymer sourced under the trade name TEGOSTAB B8404 from Goldschmidt AG.

As far as the catalyst system is concerned, selection of appropriate catalysts is crucial to the effective performance of the polyurethane polymerisation reaction. In the present instance, a combination of a tin catalyst and an amine catalyst is desirable.

As the amine catalyst may be used tertiary amines or materials which generate tertiary amines such as trimethylamine, triethylene diamine, N-methyl morpholine, N,N-dimethyl cyclohexylamine (DMCHA) and N,N-dimethyl aminoethanol. Catalysts of the above type may be obtained under the trade name POLYCAT® from Air Products and Chemicals, Inc. and, in the present instance, POLYCAT 8® is preferred.

A tin based catalyst is also desirably to be selected. The tin compound may be a hydrocarbon tin alkyl carboxylate, dibutyl tin diacetate, dibutyl tin dioctoate, dibutyl tin dilaurate and stannous octoate. A suitable tin catalyst is proprietary dibutyl tin dilaurate sourced from Air Products and Chemicals, Inc. under the trade name T12®, which is especially preferred in the present instance.

Other catalysts may be selected by those skilled in the art and the nature of the catalyst employed is not intended to place a restriction upon the scope of the present disclosure.

A specific blowing agent, additional to the compounds forming the fire retardant agent, is not required in accordance with the present invention but the use of such an agent is not absolutely precluded. A solvent such as acetone or methylene chloride which is volatile and which consequently allows cell formation, in association with the fire retardant agent described above, may be added. In the present instance, acetone is employed as the solvent.

Addition of a small quantity of water at the polymerisation stage will also assist with cell formation and its use is highly recommended in the present instance.

Thus, in accordance with the above, the following formulation is most preferable for use in the present invention:

| Component | Proportion by Weight (%) |
| --- | --- |
| Primary Polyol ("Voranol 360A") | 16.33 |
| Secondary Polyol ("PS3152") | 2.88 |
| Water | 0.29 |
| Surfactant ("Sil L5420") | 0.19 |
| Amine Catalyst ("POLYCAT 8") | 0.38 |
| Tin Catalyst ("T12") | 0.19 |
| Acetone | 4.61 |
| MDI | 24.40 |
| Fire Retardant Agent | 50.72 |

The fire retardant agent has the following optimum composition

| Component | | Proportion by Weight (%) |
| --- | --- | --- |
| ammonium bromide | (A) | 55.11 |
| ammonium diphosphate | (B) | 9.85 |
| ammonium monophosphate | (C) | 9.85 |
| urea | (D) | 25.19 |

The method of production of a rigid polyurethane foam in accordance with a preferred embodiment of the present invention proceeds as follows:

Preparation of Fire Retardant Agent

Each of the compounds (A), (B), (C), (D) is to be dried until a stable moisture content is achieved. As excessive moisture may prove detrimental to the compressive strength of the product foam, it is to be avoided at all costs.

The drying of the compounds is to occur at a temperature such that decomposition thereof does not occur. In this connection, urea melts at 132.7° C. and the phosphates also decompose at low temperature. If storage after drying is required, moisture must be excluded from the storage vessel. Storage will require the vessel to be resistant to corrosion. A suitable container is a plastic drum with sealable lid inside which has been placed a poly bag and possibly vacuum sealed. As the activity of the compounds may decrease with storage time, prolonged storage is not recommended.

The compounds are then to be thoroughly mixed together in a blender from which moisture is excluded and ground to a fine powder having average particle size preferably between 20 µm and 50 µm. A particle size in this range is desirable from the point of view of better dispersion within the polymerisation mixture and assists in efficient mixing. To improve flowability of the mixture, a flow promoter, such as tricalcium phosphate (TCP), may be added, in a proportion of between 1 and 3% by weight of the fire retardant agent, to improve mixing and flowability of the final powder.

Preparation of Polyurethane Foam

In accordance with a preferred embodiment of the present invention, the fire retardant agent is introduced and mixed with the diisocyanate, MDI, to form the isocyanate component following preparation of the fire retardant agent.

However, this is not to place any limitation on the process of the invention. It is not intended to preclude addition of the fire retardant agent to the polyol as an initial step. In addition, the following sequence of operations is not intended to place any limitation on the foam preparation sequence. The object of the present invention is to produce polyurethane foams with acceptable fire resistance from the point of view of end users. Any mixing sequence that achieves this end is considered to fall within the scope of the invention. The following described sequence has been found beneficial but is in no way exhaustive.

Reference is now made to FIG. 1 and an apparatus in which a polyurethane preparation process in accordance with a second aspect of the present invention may be performed.

The apparatus comprises a reception/storage vessel 1 in the form of a hopper to which the above described proportions of isocyanate, namely MDI, and the fire retardant agent being in finely divided crystalline form are manually or automatically dosed, desirably in the absence of air. The next step is to mix these components together and this is achieved by use of mono pump 2 or other suitable mixing apparatus suitable for mixing these constituents and reference is made to Perry et al., Chemical Engineering Handbook, Chapter 6, 5th Edition from which other suitable mixers may be selected. This pump includes a mixing means in the form of an auger or archimedes screw, the speed of rotation of which dictates the dosing rate of the isocyanate and fire retardant agent into the foam preparation process. Valve 3 may be closed to allow recirculation of the mixture through recycle line 4 back to storage vessel 1 until a suitable consistency of the mixture has been achieved. Such consistency may be checked by appropriate sampling. If desired, a static mixer of the type described below may be included in recycle line 4.

The control of water ingress and possible side reactions of the mixed isocyanate component with air commends the maintenance of an inert gas atmosphere in the headspace of vessel 1 which is sealed and blanketed with the inert gas during processing of a batch. Addition of the components to vessel 1 may take place through a port or ports in the vessel.

Upon attainment of a suitable degree of mixing of the constituents constituting the isocyanate component, valve 3 is opened and first introduction means 5 which may be an injector, needle valve, dosing pump or other suitable dosing means is operated to allow bringing into contact with the isocyanate component, a polyol component which is a mixed liquid formed from Voranol 360A (primary polyol), Stepanpol PS 3152 (secondary polyol), Sil L 5420 (surfactant), and acetone. Premixing of these components is appropriate prior to bringing the product polyol component into contact with the isocyanate component.

Mixing of the polyol component and isocyanate component then takes place in a mixing means such as static mixer 6. A static mixer has good mixing characteristics and a suitable mixer may be sourced from Kenics Corporation, as described in Perry et al, Chemical Engineers Handbook, 5th Edition, McGraw-Hill New York (1982). The mixer consists of twelve alternate-hand helical elements juxtaposed at an angle of 90° to one another inside a tubular housing. The fluid media mix during their passage through the mixer. Energy for the mixing is provided by mono pump 2 causing flow through the static mixer 6 and, if a pump is used to cause flow of the polyol component through the first introduction means 5, also that pump. The static mixer may be replaced by a mixer allowing a similar degree of high intensity mixing; alternative mixers may be found in the high intensity mixers described in Perry et al, Chemical Engineering Handbook, Chapter 6, 5th Edition, the contents of which are hereby incorporated by reference.

At the end of the mixing operation in static mixer 6 water, a polymerisation catalyst component being a tin catalyst T12®, and amine catalyst, POLYCAT 8®, are introduced by second introduction means 7, again dosing pump, injector, needle valve or other suitable dosing means to the mixture of polyol and isocyanate components. It is only after the introduction of the polymerisation catalyst component to the mixture that an appreciable degree of polymerisation can occur. The polymerisation reaction is to proceed in a high speed high intensity mixer 8, a suitable type of which has been designed and built by the applicant, Bains Harding Limited. Polymerisation occurs instantaneously and residence time of less than two seconds in the mixer is envisaged.

The preferred mixer 8 is a pin mixer provided with a shaft 9 on which are provided a number of pin-like protrusions 10. The shaft is caused to rotate by a hydraulic motor driving a ram which is forced down upon the shaft to cause high speed rotation of the shaft at up to 7000 rpm, but preferably 5000 to 6000 rpm. The construction of the shaft and pin-like protrusions strictly confines the polymerisation reaction mixture within the body of pin mixer 8 and, in combination with the rapid rotation of the shaft and action of the pins, enables a very high degree of intensive mixing to be attained.

Following mixing, the foam may be extruded as a bun or passed to a mould for construction of rigid foam articles such as panels and other desired structures.

The above described apparatus requires a high degree of corrosion resistance and stainless steel is the recommended material of construction. Seals between items of equipment such as mono pump 2 and static mixer 6 should be of a resistant rubber, such as the fluoroelastomer supplied under the trade name VITON®.

Any valves in the apparatus, especially valve 3, should be "one-way" such that reflux of mixtures to preceding portions of the apparatus is avoided. The apparatus described above is capable of providing 90 kg/minute of product polyurethane foam.

Curing of the product foam may be desirable to allow the solvent to permeate through, and evaporate from, the foam. A period of 24 to 48 hours may be allowed to compensate for this contingency. At a fixed loading of 50% by weight polyurethane foam fire retardant agent the product foam has a compressive strength of 91.4 KPa or greater and does not demonstrate a tendency to ignite. Non-ignitability is observed on a qualitative basis at additions of fire retardant agent above approximately 30% by weight of the polyurethane foam fire retardant agent. The most preferred range for fire retardant agent addition is 50 to 53% by weight of the polyurethane foam.

EXAMPLE 1

The fire retardant performance of two rigid foams were evaluated by the Australian Department of Defence, Industry Support Office in accordance with ASTM E 1354-92, "Standard Test Method for Heat and Visible Smoke Release Rates for Materials and Products Using an Oxygen Consumption Calorimeter". The contents of ASTM E 1354-92 are hereby incorporated by reference.

The following properties were determined at heat fluxes between 25 and 75 kW/m$^2$: (a) time to ignition, (b) rate of heat release (RHR), (c) effective heat of combustion (EHC), (d) smoke obscuration, and (e) mass loss.

The rigid foam comparison was made with a rigid polyisocyanurate foam supplied by another chemical manufacturer with an organic non-halogenated fire retardant agent being.

|  | Rigid Foam A | | Rigid Foam B | Comparative | Example |
|---|---|---|---|---|---|
| Flux (kW/m$^2$) | 25 | 75 | 75 | 25 | 75 |
| Time to Ignition(s) | Did Not Ignite (DNI) | (DNI) | DNI | DNI | 12[1] |
| Maximum Rate of Heat Release (kW/m$^2$) | — | — | — | — | 83.3 |
| Time to maximum Rate of Heat Release(s) | — | — | — | — | 40 |
| Average Rate of Heat Release (kW/m$^2$) | — | — | — | — | 62.6 |
| Average Smoke Obscuration (m$^2$/kg) | 747 | — | 719 | 1082 | 786 |
| Loss on Ignition (%) | — | — | — | — | 60.7 |

[1]ignited without igniter, the rigid foams A and B prepared in accordance with the process and formulation of the invention did not ignite within the time allowed for the test, 600 seconds.

Although the rigid polyurethane foam of the comparative example did not ignite at a heat flux of 25 kW/m$^2$, the smoke obscuration was substantially greater than in the case of rigid foam A. The foam of the comparative example did burn within 12 seconds with Loss on Ignition 60.7% by weight at a heat flux of 75 kW/m$^2$.

EXAMPLE 2

Rigid foam A prepared in accordance with the process and formulation of the invention was also subjected to testing under Australian Standard AS 1530, Part 3, the contents of which are hereby incorporated by reference, with the following results:

| Ignitability | 0 |
|---|---|

-continued

| | |
|---|---|
| Spread of Flame | 0 |
| Heat Evolved | 0 |
| Smoke Developed | 7 |

This rating is provided on a scale of 0 to 10 with 0 being the best rating and confirms the feature of non-ignitability demonstrated in Example 1.

We claim:

1. A fire retardant agent to be incorporated in a plastic foam which functions as a blowing agent and comprises a mixture of soluble ammonium salts being ammonium monophosphate, ammonium diphosphate and an ammonium halide; and urea.

2. The agent as claimed in claim 1 wherein the ammonium halide is ammonium bromide.

3. The agent as claimed in claim 1 wherein the proportions by weight of the fire retardant agent of each component are as follows:
   50 to 60 weight percent ammonium halide
   5 to 15 weight percent ammonium monophosphate
   5 to 15 weight percent ammonium diphosphate
   20 to 30 weight percent urea.

4. The agent as claimed in claim 3 wherein the proportions by weight of the agent of each component are as follows:
   52 to 58 weight percent ammonium halide
   8 to 11 weight percent ammonium monophosphate
   8 to 11 weight percent ammonium diphosphate
   24 to 28 weight percent urea.

5. A polyurethane foam comprising the fire retardant agent as claimed in claim 1.

6. An article manufactured from the polyurethane foam as claimed in claim 5.

7. The agent as claimed in claim 3 wherein said ammonium halide is ammonium bromide.

8. The agent as claimed in claim 4 wherein said ammonium halide is ammonium bromide.

9. A formulation for manufacture of a polyurethane foam comprising an isocyanate; a polyol; a polymerisation catalyst system and a fire retardant agent comprising a mixture of soluble ammonium salts being ammonium monophosphate, ammonium diphosphate and ammonium halide; and urea.

10. The formulation as claimed in claim 9 wherein the isocyanate comprises diphenyl methane diisocyanate, methylene bisphenyl isocyanate and polymethylene polyphenyl isocyanate.

11. The formulation as claimed in claim 9 wherein the ammonium halide is ammonium bromide.

12. The formulation as claimed in claim 9 wherein the proportions by weight of the fire retardant agent of each component are as follows:
    9 to 58 weight percent ammonium halide
    8 to 11 weight percent ammonium monophosphate
    8 to 11 weight percent ammonium diphosphate
    24 to 28 weight percent urea.

13. The formulation as claimed in claim 11 comprising a nonhydrolysable surfactant.

14. The formulation as claimed in claim 11 wherein each soluble ammonium salt and urea is a crystalline solid ground to a size of between 20 and 50 microns.

15. The formulation as claimed in claim 9 wherein the fire retardant agent forms 50 to 53 percent by weight of the product polyurethane foam.

16. The formulation as claimed in claim 9 including glycerol or glycerine.

17. A polyurethane foam produced from the formulation as claimed in claim 9.

18. An article manufactured from the polyurethane foam as claimed in claim 17.

19. A process of polyurethane foam manufacture comprising:
    (a) mixing an isocyanate and a polyol with a fire retardant agent comprising a mixture of soluble ammonium salts being ammonium monophosphate, ammonium diphosphate and an ammonium halide; and urea;
    (b) adding a solvent; and
    (c) adding at least one polymerisation catalyst and optionally water and conducting the polymerisation reaction to produce a polyurethane foam.

20. The process as claimed in claim 19 wherein the polymerisation catalyst is a tin compound.

21. The process as claimed in claim 19 wherein the polymerisation catalyst is an amine.

22. The process as claimed in claim 19 wherein the polymerisation catalyst comprises an organo tin compound in combination with an amine.

* * * * *

UNITED STATES PATENT AND TRADEMARK OFFICE
CERTIFICATE OF CORRECTION

PATENT NO. : 5,882,550
DATED : Mar. 16, 1999
INVENTOR(S) : Christopher John Regan It is certified that error appears in the above-identified patent and that said Letters Patent is hereby corrected as shown below:

Claim 12, line 4, "9" should be --52--.

Signed and Sealed this

Twentieth Day of July, 1999

Attest:

Q. TODD DICKINSON

Attesting Officer

Acting Commissioner of Patents and Trademarks